United States Patent [19]

Takaba

[11] Patent Number: 4,839,552
[45] Date of Patent: Jun. 13, 1989

[54] BRUSHLESS DC MOTOR

[75] Inventor: Yosuke Takaba, Tokyo, Japan

[73] Assignee: Tamagawa Seiki Kabushiki Kaisha, Tokyo, Japan

[21] Appl. No.: 55,030

[22] Filed: May 28, 1987

[30] Foreign Application Priority Data

Jun. 11, 1986 [JP] Japan .................. 61-133835

[51] Int. Cl.⁴ .................. H02K 29/00; H02K 3/04
[52] U.S. Cl. .................. 310/268; 310/216; 310/256
[58] Field of Search ............ 310/42, 49 R, 216, 218, 310/268, 256

[56] References Cited

U.S. PATENT DOCUMENTS

| 1,136,942 | 4/1915 | Cutten | 310/42 |
| 4,455,516 | 6/1984 | Furusho | 310/268 |
| 4,547,713 | 10/1985 | Langley et al. | 310/262 |
| 4,698,539 | 10/1987 | Workman | 310/216 |
| 4,712,034 | 12/1987 | Iwasaki | 310/216 |

FOREIGN PATENT DOCUMENTS 57-163185 10/1982 Japan .
58-115887 8/1983 Japan .

Primary Examiner—Patrick R. Salce
Assistant Examiner—Judson H. Jones
Attorney, Agent, or Firm—Brooks Haidt Haffner & Delahunty

[57] ABSTRACT

A brushless DC motor in which a rotary axis is rotatably mounted in a bearing portion of a stator housing, a rotor yoke is fixedly mounted on an end portion of said rotary axis, a magnet member is mounted on the face of said rotor yoke, a return yoke of ring shape is mounted to one face of said stator housing, a plurality of circumferentially extending cavity portions are formed in said return yoke spaced apart from each other in the radial direction relative to the rotary axis, and a driving coil is positioned facing said rotor yoke.

Therefore, core loss caused in said return yoke is reduced by said cavity portions of said return yoke, whereby it is able to obtain high stability at high speed rotation.

3 Claims, 2 Drawing Sheets

BRUSHLESS DC MOTOR

BACKGROUND OF THE INVENTION

Field of the Invention

This invention relates to a brushless DC motor, and particularly to reducing core loss caused in a return yoke for obtaining a motor of high speed rotation.

There are a variety of systems known for a brushless DC motor. A construction of being manufactured by the assignee of the present application in its own factory is shown in FIG. 5.

Namely, in FIG. 5, numeral 1 is a stator housing of a disk shape, a rotary axis 3 is rotatably mounted in bearing portion 2 mounted in a center portion of said stator housing 1.

A rotor yoke 4 of a disk shape is fixedly mounted to an end portion of said rotary axis 3 as one body, a magnet member 5 of ring shape is fixedly mounted under said rotor yoke 4 as one body.

A return yoke 6 of a ring disk is fixedly mounted on one surfacce of said stator housing 1, said return yoke 6 is composed of an iron plate.

Further, a plurality of a driving coils 7 of a triangle shape are mounted on said return yoke 6 as one body.

Referring now to the operation of the above noted brushless DC motor:

In the condition of FIG. 5, the certain driving signals are applied to said driving coils 7 through an electronic switching means (not shown), said rotor yoke 4 is continuously rotated by a magnetic operation in relation of said magnet member 5, said driving coil 7 and said return yoke 6.

With the above described brushless DC motor, there are presented the following various problems.

Core loss increases in proportion to a self-multiplication of rotary speed of said rotor yoke 4, whereby it is very difficult to obtain a preferable efficiency and power consumption for a high speed rotation about 2000 RPM such as a spindle motor for floppy disk (FDD) and VTR.

Further, according to the increase of said core loss, in case said motor was employed for said FDD and VTR, circuit parts of said FDD and VRT are injured by heat therefrom, whereby a characteristic of said FDD and VTR becomes worse and life thereof becomes lower.

SUMMARY OF THE INVENTION

It is a principal object of the present invention to eliminate the aforementioned deficiencies of the prior motor and provide a brushless DC motor which reduces return yoke for obtaining high speed rotation thereof.

With the burshless DC motor of the present invention, a rotary axis is rotatably mounted to a bearing portion of a stator housing, a rotor yoke is fixedly mounted to an end portion of said rotary axis, a magnet member is mounted to one face of said rotor yoke, a return yoke of ring shape is mounted to one face of said stator housing, a plurality of cavity portions are formed in said return yoke in the radial direction thereof, a driving coil is positioned opposite said rotor yoke.

Therefore, core loss caused in said return yoke is reduced by said cavity portions of said return yoke, whereby it is able to obtain high stability at high speed rotation.

BRIEF DESCRIPTION OF THE DRAWINGS

The accompanying drawings illustrate a preferred embodiment of the brushless DC motor according to the present invention.

DESCRIPTION OF THE PREFERRED EMBODIMENT

Referring now to a preferred embodiment of the present invention accompanying drawings in which:

Numeral 1 shows a stator housing of disk shape, a rotary axis 3 is rotatably mounted in bearing portions 2 which are positioned at the axial center of said stator housing.

A rotor yoke 4 of disk shape is fixedly mounted on an end portion of said rotary axis 3, a magnet member 5 of ring shape is mounted on one face of said rotor yoke 4 as one body.

Figure 2:
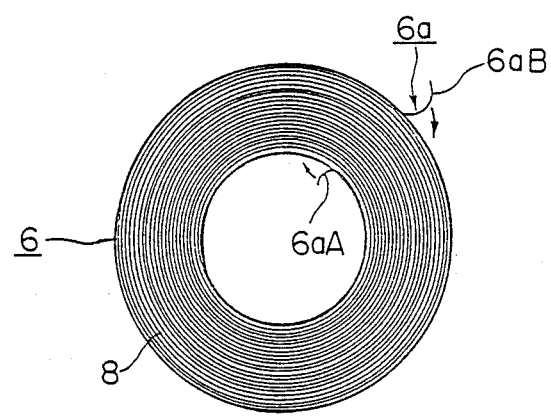
FIG. 2 shows a flat plan view of a return yoke.
Figure 3:
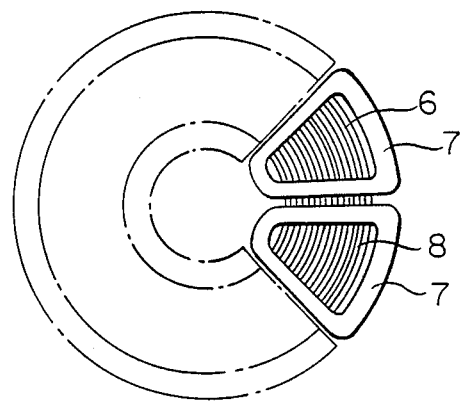
FIG. 3 shows a partial flat plan view of a combination construction of said return yoke and driving coil in FIG. 1.

A return yoke 6 of ring shape is fixedly mounted on one face of said stator housing 1, said return yoke 6 is made of a metal band member 6a composed of one thin iron plate shown in FIG. 2. Said metal band member 6a has an anti-eddy current construction in which a beginning portion 6aA thereof whirls to an end portion thereof. Said metal band member 6a is composed of a single band whereby a plurality of cavity portions of almost ring shape are created in the radial direction of the yoke.

Therefore, it is possible to obtain the same electric magnetic operation as a stacked construction that uses a plurality of metal plates.

Further, a plurality of driving coils 7 of triangular shape from the viewpoint of flat plan are mounted on said return yoke 6.

Figure 1:
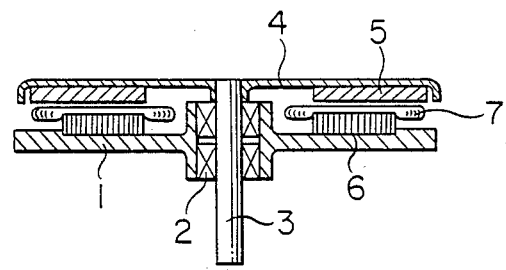
FIG. 1 shows a cross-sectional view of a complete motor construction.

Referring now to the operation of the brushless DC motor not the above noted construction of the present invention:

In the condition of FIG. 1, a driving signal is applied to said driving coils 7 via an electronic switching means of shown, said rotor yoke 4 is continuously rotated by the magnetic cooperation of said magnet 5, driving coil 7 and return yoke 6. In the above noted rotary operation, it is possible to reduce the core loss of said return yoke 6 itself by said cavity portions 8 formed in said return yoke 6, further it is able to reduce core loss caused in high speed rotation thereof.

Figure 4:
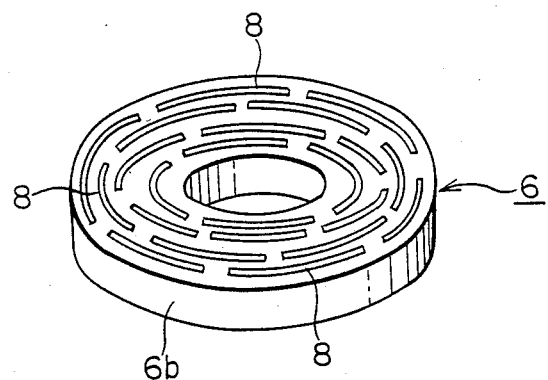
FIG. 4 shows a perspective view of another embodiment of said return yoke in FIG. 1.
Figure 5:
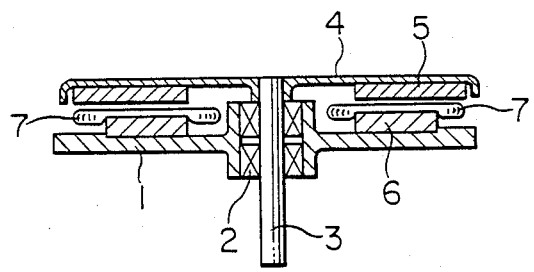
FIG. 5 shows a cross-sectional view of a brushless DC motor of prior construction.

FIG. 4 shows another embodiment of said return yoke 6, said return yoke 6 is composed of metal ring plate 6b of a certain thickness different from said eddy shaped metal band 6a aforementioned in the above noted embodiment, a plurality of cavity portions 8 of arcuate shape are formed therein.

Therefore, said return yoke 6 in FIG. 4 is able to reduce core loss in the same way as said laminar metal construction as shown in FIG. 2.

Further, it is possible to obtain the same effect by a return yoke construction in which a plurality of metal band rings having different diameters from each other are constructed by an adhesive means as one body so as to have a plurality of cavity portions 8 therebetween.

According to the present invention, it is possible to remarkably reduce core loss caused in said return yoke and to obtain high stability of rotation in a high speed rotation of an FDD spindle motor and VTR cylinder motor.

What is claimed is:

1. A brushless DC motor comprising in combination a rotatable shaft mounted in a bearing assembly in a stator housing, a disc-like rotor yoke having a flat central portion fixedly mounted on one end of said rotatable shaft perpendicular to the longitudinal axis of said shaft, a flat annular magnet member mounted on said central portion of said rotor yoke on the side of said yoke that faces said shaft, a return yoke of flat ring shape mounted on a face of said stator housing spaced from and facing said magnet member parallel thereto, a plurality of circumferentially extending cavities in said return yoke which cavities extend in the axial direction relative to said shaft completely through said return yoke and are spaced apart from each other in the radial direction relative to said shaft, as least one triangularly shaped generally flat driving coil mounted on said return yoke on the side facing said rotor yoke parallel to and spaced from said magnet member, whereby high speed motor operation is obtained with reduced core losses in said return yoke.

2. A brushless DC motor as claimed in claim 1, wherein said return yoke is formed by winding into a coil a continuous band of metal coated with electrically insulating material, the interfacial space between successive turns of said coil constituting said cavities.

3. A brushless DC motor as claimed in claim 1, wherein said return yoke is formed by a plurality of concentric metal band rings of differing diameter assembled with a bonding adhesive interposed between successive rings and the spaces between said rings constituting said cavities.

* * * * *

UNITED STATES PATENT AND TRADEMARK OFFICE
CERTIFICATE OF CORRECTION

PATENT NO. : 4,839,552

DATED : June 13, 1989

INVENTOR(S) : Y. Takaba

It is certified that error appears in the above-identified patent and that said Letters Patent is hereby corrected as shown below:

Title page:

In the Abstract, line 4, after "on", delete "the", insert --one--.

Col. 1, line 11, delete "of" ; line 14, after "of", delete "a"; line 15, after "in" insert --a--;
line 56, correct spelling "brushless".

Col. 2, line 20, after "invention" insert --and to the--; line 27, insert period --.-- at end of line; line 28, delete "as one body"; line 50, delete "of", insert --not--.

Col. 3, line 1, delete "constructed by an", insert --assembled with--.

Col. 3, line 5, delete "in a", insert --with--.

Signed and Sealed this

Tenth Day of July, 1990

Attest:

HARRY F. MANBECK, JR.

*Attesting Officer*   *Commissioner of Patents and Trademarks*